United States Patent
Gött et al.

[15] 3,692,970
[45] Sept. 19, 1972

[54] ELECTRIC RESISTANCE WELDING MACHINES

[72] Inventors: Hans Gött; Klaus Ritter; Josef Ritter, all of Graz, Austria

[73] Assignee: Evg Entwicklungs U. Verwertungsgesellschaft m.b.H., Graz, Austria

[22] Filed: March 22, 1971

[21] Appl. No.: 126,828

[30] Foreign Application Priority Data

March 25, 1970 Austria............................2801

[52] U.S. Cl. .......................219/56, 219/78, 219/87
[51] Int. Cl. ................................................B23k 11/00
[58] Field of Search........219/56, 78, 87, 88, 89, 106, 219/107, 119; 140/112

[56] References Cited

UNITED STATES PATENTS 3,405,743  10/1968  Robinson.....................219/56

*Primary Examiner*—C. L. Albritton
*Attorney*—Ernest F. Marmorek

[57] ABSTRACT

An electric resistance welding machine has several pairs of active electrodes below the work piece, such as mesh, being welded. Above the work piece a current bridge is provided for each pair of active electrodes, the current bridge being lowered in use so that the work piece is gripped at welding points between the active electrodes and the bridge, the welding current flowing from one active electrode, through the work piece at one welding point, across the current bridge, through the work piece of the other welding point, and back to the other of the pair of active electrodes.

The current bridge is pivoted near its two ends on the ends of guided thrust rods which are spring loaded with independent adjustment of the two spring loads, each thrust rod having fixed near one end a spring support which seats in a seating and is accurately located when in contact therewith, the other end of each thrust rod being loosely guided so that the bridge during its work piece engaging movement can perform a limited deflection having both rotary and translational components.

5 Claims, 2 Drawing Figures

PATENTED SEP 19 1972 3,692,970
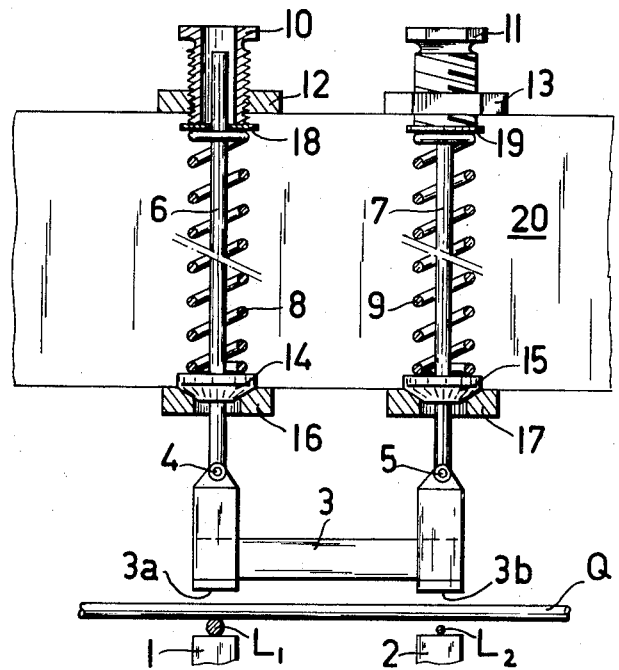
FIG. I.
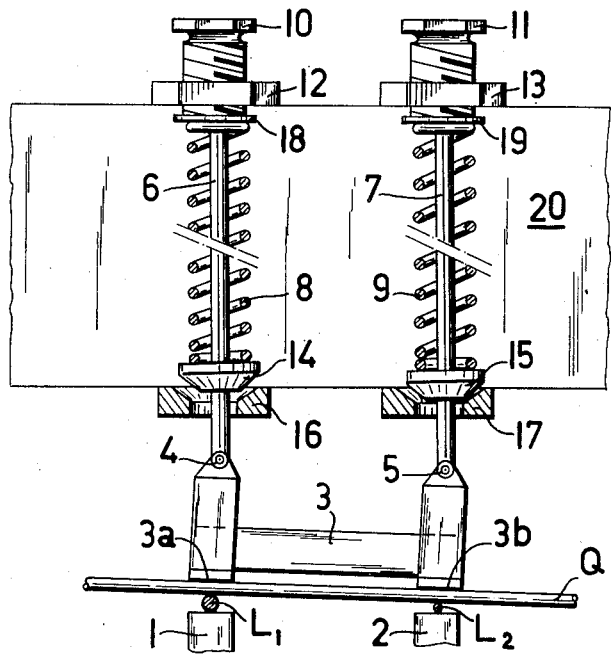
FIG. 2.
INVENTORS
Hans Gött,
Klaus Ritter and
Josef Ritter,
BY Ernest D. Marmorek,
THEIR ATTORNEY.

ELECTRIC RESISTANCE WELDING MACHINES

In one kind of electric resistance welding machine, a pair of active electrodes, connected in use to the secondary windings of transformers, are situated on one side, usually underneath, a workpiece to be welded, whereas on the other side, usually above the workpiece, a passive current bridge conducts the welding current across between the two welding points contacted by the active electrodes. In machines of this kind used for making welded wire mesh for example the current flows from one of the active electrodes, over a wire crossing point, over the passive current bridge situated on the other side of the workpiece plane, and finally over a second wire crossing point to a second active electrode. Normally the machines have several pairs of active electrodes and a current bridge to cooperate with each pair.

Known machines of this kind have supporting devices for the current bridges, arranged as follows. Each current bridge is centrally supported, half way between its two contact surfaces, the current bridge support itself being mounted on the electrode beam. The current bridge support has a limited freedom of movement, relative to the electrode beam, in the direction of movement of the electrode beam which is movable perpendicular to the workpiece plane, for example the plane of the wire mesh being welded. The electrode beam supports all the current bridge supports.

It is important to ensure that the welding pressure, that is to say the thrust applied by contact surface of the bridge to the workpiece is everywhere the same, that is to say all the welding thrusts applied by the electrodes to the welding points must be the same even if the thickness of the workpiece varies between one welding point and another. In wire mesh, for example wires of different diameters may be used in the same piece of mesh. In the known machines this requirement is partially satisfied by means of a system of helical springs, or hydraulic or pneumatic pistons, the hydraulic or pneumatic pressure being adjustable.

However this known arrangement, in which the current bridges are supported by current bridge supports acting at their middle points has a number of disadvantages, as follows:

Supported at its middle point, the current bridge acts as a rocking lever. The welding pressures applied by the two contact surfaces of the current bridge to the two wire crossing points are exactly the same as each other only if the support point is exactly in the middle of the bridge, that is to say exactly half way between the welding points. This condition may be inconvenient, or even impossible to satisfy. For example, in wire mesh, the distances between the longitudinal wires of the grating are often changed between welding runs, even though it may be only by a little. Consequently the current bridge has to be shifted along the electrode beam, that is to say the current bridge support has to be shifted along the electrode beam, so as to center the current bridge support once more accurately between the two wire crossing points. This has to be done, in order to equalize the two welding pressures, even though the contact surfaces of the current bridge are themselves wide enough to accommodate the small differences in the positions of the longitudinal wires.

Supporting the current bridge by a single support in the middle has a further disadvantage due to the fact that it is sometimes necessary for the bridge to deform the workpiece at one of the welding points but not at the other to bring the two parts of the workpiece into contact, the thrust remaining for clamping the two parts together during welding thus being reduced. For example, longitudinal wires of different diameters are nowadays often used in the same piece of wire mesh, for various reasons, particularly in mesh for concrete reinforcement. If a single current bridge has to weld two longitudinal wires of different diameters, before the transverse wire can be brought into firm contact with both the longitudinal wires it first has to be bent. The thrust required for the bending unevenly consumes a part of the available welding pressure, with the result that the thinner longitudinal wire receives less welding pressure than the thicker one, and consequently the electrical resistance is greater over the crossing point of the thinner longitudinal wire. This crossing point is therefore not welded so well as the other one, and an unevenly welded grating is produced.

Finally a further difficulty arises in regard to the helical springs, or hydraulic or pneumatic spring system which, acting at a single point in the middle of the current bridge, thrusts the current bridge downwards away from the electrode beam. Difficulties are encountered in making this single spring strong enough to apply the necessary welding pressure over the current bridge to the two wire crossing points.

In accordance with the present invention, the or each current bridge of a machine of the kind described is pivoted, near its two ends, on the ends of guided thrust rods which are spring loaded with independent adjustment of the two spring loads, each thrust rod having fixed near one end a spring support which seats in a seating, the spring supports and the seatings having self centering complementary contact surfaces, the other end of each thrust rod being guided loosely, with an appreciable radial play allowing the current bridge, during its workpiece engaging movement, starting out from an initial position which is determined by the self centering contact surfaces of the spring supports and the seatings, to perform a limited deflection which has both rotary and translational components.

Assuming that the bridge is going to weld two wire crossing points of different total thicknesses, at the beginning of the working cycle the current bridge, in its position of rest, extends parallel to the workpiece plane. During the first part of the downward movement of the electrode beam the current bridge first makes contact, with one of its contact surfaces, with the thicker of the two wire crossing points. With further downward movement of the electrode beam the current bridge rocks sideways, performing a combined rotary and translational movement during which the second contact surface of the bridge brings the two wires at the second crossing point into contact with each other. By applying a higher spring load to the thrust rod acting on the second contact surface of the current bridge it is ensured that during the welding operation both crossing points receive the same welding pressure.

Preferably the guided thrust rods are spring loaded by helical springs surrounding each rod, each helical spring thrusting with one end against the spring support near one end of the rod, the other end of the spring thrusting against a washer, through which the rod passes, the washer itself thrusting against an externally threaded bush which is screwed adjustably into a nut fixed to the electrode beam to provide adjustment of the spring loading, the thrust rod projecting into the bush with appreciable radial play. This allows the two helical springs to be loaded individually, before the beginning of the welding operation, to suit different diameters in the longitudinal wires distributed across the welding machine, so as to obtain the same welding pressures at all the wire crossing points.

An example of a machine according to the invention will now be described in greater detail with the help of the drawing, in which:

FIGS. 1 and 2 show diagrammatically a current bridge mounting of the machine in a rest position and a working position respectively.

Two longitudinal wires $L_1$ and $L_2$ of a piece of mesh rest on the upper surfaces of active electrodes 1 and 2, which are connected to secondary windings of a transformer. Over the longitudinal wires there extends a transverse wire Q. Above the wires, at their crossing points, there is a current bridge 3 which is pivoted, near its two ends, on two pivots 4 and 5 on the lower ends of two thrust rods 6 and 7. The upper ends of the thrust rods work loosely, with a good deal of play, in two bushes 10 and 11 which have external threads and screw, for adjustment, in nuts 12 and 13 fixed to the upper surface of an electrode beam 20.

Surrounding the thrust rods 6 and 7 there are helical compression springs 8 and 9 supported at their lower ends by support collars 14 and 15 fixed to the thrust rods 6 and 7. At their upper ends the springs 8 and 9 thrust against washers 18 and 19 which thrust upwards against the lower surfaces of the two externally threaded bushes 10 and 11. By screwing the bushes 10 and 11 further into the nuts 12 and 13, or unscrewing them, the two springs 8 and 9 can be independently loaded to different degrees.

The lower surfaces of the spring support collars 14, 15 are conical and conform exactly to the internal surfaces of corresponding collar seat cups 16 and 17, fixed to the lower surface of the electrode beam 20. The collar seat cups have central drillings through which the thrust rods 6 and 7 pass, with ample radial clearance. The support collars 14 and 15 limit the downward movements of the rods relative to the beam 20. When the device is at rest the two collars 14 and 15 sit precisely positioned in the cups 16 and 17, thrust firmly downwards by the two springs.

The electrode beam 20 consists of two vertical walls, fairly close together and extending transversely right across the welding machine. The thrust rods of each current bridges 3, of which there are several, are enclosed between these two vertical walls, the nuts 12 and 13 and the seat cups 16 and 17 acting as the structural members which join the two walls together.

When the electrode beam 20 is in its raised position, that is to say its position of rest, as represented in FIG. 1, the current bridge 3 is not in contact with the workpiece wires. The springs 8 and 9 thrust the spring support collars 14 and 15 firmly down into their collar seat cups 16 and 17. It should be observed that under these circumstances the current bridge 3 is positioned precisely parallel to the electrode beam, and parallel to the workpiece plane, the collars seating precisely in position in the cups.

Assuming that the workpiece wires are in position, ready for welding to begin, the electrode beam 20 is lowered, bringing at first the contact surface 3a against the transverse wire Q just above the thicker longitudinal wire $L_1$. With further downward movement of the electrode beam 20, the spring 8 is compressed, the collar 14 lifting up out of its seat 16, and the current bridge pivoting clockwise about its pivot 5 until the contact surface 3b contacts the transverse wire Q above the thinner longitudinal wire $L_2$. Once this has occurred, with further downward movement of the electrode beam 20 the downward thrust of the contact surface 3b bends the transverse wire Q downwards, ultimately bringing it into contact with the thinner longitudinal wire $L_2$. The loading on the two helical compression springs 8 and 9 is adjusted, by means of the two adjustment bushes 10 and 11, before the machine is put into operation for the particular welding job, in such a way that in the first place the transverse wire Q is bent, as described above, and secondly so that once the transverse wire has come into contact with the thinner longitudinal wire $L_2$ the two thrust rods 6 and 7 from then onwards both thrust downwards, with further downward movement of the electrode beam 20, so as to apply practically the same welding pressure to the workpiece material at the two crossing points Q, $L_2$ and Q, $L_1$, even though the two longitudinal wires have different diameters. To obtain this result, the spring loading of the rod 7 is considerably higher than that of the rod 6.

The example described above by no means exhausts constructional possibilities nor possible applications of the invention. Independent adjustment of the loads applied to the two guided thrust rods can for example if desired be obtained by pneumatic or hydraulic means. Instead of conical spring support collars engaging with conical seat cups there can if desired be used spherical collars seating in spherical cups. In regard to applications, the invention is not limited to mesh welding machines.

We claim:

1. An electric resistance welding machine having at least one pair of active electrodes disposed to one side of a work piece plane, an electrode beam disposed to the other side of said work piece plane, and at least one current bridge mounted on said electrode beam, the improved mounting means for said current bridge comprising a first thrust rod, means pivotally connecting an end of said first thrust rod to said current bridge adjacent one end thereof, a second thrust rod, means pivotally connecting an end of said second thrust rod to said current bridge adjacent the other end thereof, spring support means on each of said first and second thrust rods, locating means on each of said first and second thrust rods, seating means on said beam for each of said locating means, said locating means and said seating means having self-centering tapering complementary contact surfaces, guide means on said electrode beam for each rod adapted to permit substantial radial movement of said rod, and adjustable spring means for each of said first and second rods adapted to urge said locating means into said seating means.

2. An electric resistance welding machine having at least one pair of active electrodes disposed to one side of a work piece plane, an electrode beam disposed to the other side of said work piece plane, and at least one current bridge mounted on said electrode beam, the improved mounting means for said current bridge comprising a first thrust rod, means pivotally connecting an end of said first thrust rod to said current bridge adjacent one end thereof, a second thrust rod, means pivotally connecting an end of said second thrust rod to said current bridge adjacent the other end thereof, spring support means on each of said first and second thrust rods, locating means on each of said first and second thrust rods, seating means on said beam for each of said locating means, said locating means and said seating means having self-centering complementary contact surfaces, guide means on said electrode support beam for each rod adapted to permit substantial radial movement of said rod, and adjustable spring means for each of said first and second rods adapted to urge said locating means into said seating means, said adjustable spring means for each of said thrust rods comprising a helical spring surrounding the respective one of said rods, a washer through which said rod passes, an externally threaded bush, and a nut fixedly supported by said electrode beam and adjustably receiving said externally threaded bush, said helical spring being disposed between said spring support means and said washer.

3. A machine according to claim 2 wherein said spring support means for each of said rods comprises a portion of a collar fixed to the respective one of said rods and said locating means comprises a different portion of said collar.

4. An electric resistance welding machine having at least one pair of active electrodes disposed to one side of a work piece plane, an electrode beam disposed to the other side of said work piece plane, and at least one current bridge mounted on said electrode beam, the improved mounting means for said current bridge comprising a first thrust rod, means pivotally connecting an end of said first thrust rod to said current bridge adjacent one end thereof, a second thrust rod, means pivotally connecting an end of said second thrust rod to said current bridge adjacent the other end thereof, spring support means on each of said first and second thrust rods, locating means on each of said first and second thrust rods, seating means on said beam for each of said locating means, said locating means and said seating means having self-centering complementary contact surfaces, guide means on said electrode support beam for each rod adapted to permit substantial radial movement of said rod, and adjustable spring means for each of said first and second rods adapted to urge said locating means into said seating means, said complementary self-centering surfaces of said locating means and of said seating means being conical.

5. An electric resistance welding machine having at least one pair of active electrodes disposed to one side of a work piece plane, an electrode beam disposed to the other side of said work piece plane, and at least one current bridge mounted on said electrode beam, the improved mounting means for said current bridge comprising a first thrust rod, means pivotally connecting an end of said first thrust rod to said current bridge adjacent one end thereof, a second thrust rod, means pivotally connecting an end of said second thrust rod to said current bridge adjacent the other end thereof, spring support means on each of said first and second thrust rods, locating means on each of said first and second thrust rods, seating means on said beam for each of said locating means, said locating means and said seating means having self-centering complementary contact surfaces, guide means on said electrode support beam for each rod adapted to permit substantial radial movement of said rod, and adjustable spring means for each of said first and second rods adapted to urge said locating means into said seating means, said complimentary self-centering surfaces of said locating means and of said seating means being spherical.

* * * * *